United States Patent
McGinnis et al.

(10) Patent No.: US 7,731,218 B2
(45) Date of Patent: Jun. 8, 2010

(54) RETRACTING TOW SYSTEM

(76) Inventors: Kevin McGinnis, 525 S. 20th, Decatur, IL (US) 62521; Sean McGinnis, 1501 Santa Fe Rd., Washington, IL (US) 61571; Thomas Fennell, 406 13th Ave., NW., Kasson, MN (US) 55944

( * ) Notice: Subject to any disclaimer, the term of this patent is extended or adjusted under 35 U.S.C. 154(b) by 267 days.

(21) Appl. No.: 11/729,116

(22) Filed: Mar. 28, 2007

(65) Prior Publication Data

US 2008/0238037 A1   Oct. 2, 2008

(51) Int. Cl.
*B65H 75/48* (2006.01)
*B60D 1/18* (2006.01)

(52) U.S. Cl. .................. 280/480.1; 242/379.2

(58) Field of Classification Search .............. 242/379.2, 242/376.1, 397, 402, 400, 375, 375.2, 378, 242/378.2; 280/480, 480.1
See application file for complete search history.

(56) References Cited

U.S. PATENT DOCUMENTS

| | | | |
|---|---|---|---|
| 1,574,552 A * | 2/1926 | Chapman | 280/480 |
| 1,587,426 A * | 6/1926 | Schwier | 280/480 |
| 1,591,686 A | 7/1926 | Silva | |
| 2,714,019 A * | 7/1955 | Williams et al. | 280/480 |
| 3,273,822 A * | 9/1966 | Merrell et al. | 242/373 |
| 3,291,416 A * | 12/1966 | Gionta | 242/376 |
| 3,881,751 A | 5/1975 | Colby | |
| 3,917,189 A * | 11/1975 | Bryll | 242/383.1 |
| 4,635,953 A * | 1/1987 | Robertson et al. | 280/480 |
| 5,350,186 A * | 9/1994 | Hull et al. | 280/480.1 |
| 5,476,280 A | 12/1995 | MacMullan | |

* cited by examiner

*Primary Examiner*—Lesley Morris
*Assistant Examiner*—Wesley Potter
(74) *Attorney, Agent, or Firm*—Gene R. Woodle

(57) ABSTRACT

A retracting tow system is disclosed which provides a spring loaded tow rope which automatically winds the tow rope around an included spool when not in use. The tow rope is affixed to a supplied shaft in a manner which prevents damage to the retracting mechanism while in use. An offset fairlead is also supplied which reduces the force on the shaft during a tow.

2 Claims, 2 Drawing Sheets

RETRACTING TOW SYSTEM

BACKGROUND OF THE INVENTION

1. Field of the Invention

This invention relates generally to an apparatus for towing vehicles and the like, and more particularly to a retracting towing system which retracts when not in use and eliminates stress on the retracting element.

2. Background Information

There are millions of vehicles in daily use in the USA and throughout the world. Most people who operate vehicles have experienced the distress of having the vehicle get stuck in mud or snow or in some other situation where the vehicle won't move under its own power. In many instances a stuck or disabled vehicle will have to be towed by a second vehicle. This usually involves hooking a two rope from the tow vehicle to the stuck or disabled vehicle so that the tow vehicle may tow the second vehicle. In other instances a vehicle may have an incorporated tow system such that the vehicle may be extracted when stuck by affixing the end of the tow rope to an object and using the tow system to pull the vehicle to a more favorable location.

A simple tow rope is, probably, most often used when a tow vehicle is towing a second vehicle. Most tow ropes are sturdy ropes with hooks affixed at either end. One end of the tow rope is affixed to the rear bumper or undercarriage of the tow vehicle and the other end is affixed to the front bumper or undercarriage of the second vehicle. The tow vehicle then pulls the second vehicle to an appropriate location. It will be understood that tow ropes and towing systems may be used for other purposes including pulling out stumps etc.

Simple tow ropes have a number of drawbacks. Such tow ropes must be removed after use and stored in some efficient manner. They also require that the tow vehicle move to pull or exert force on a second vehicle or object. During a tow it is nearly inevitable that one vehicle will, at some point, move at a different speed that the other. This causes slack in the tow rope which can lead to abrasion if the two rope drags on the ground or to the tow rope becoming tangled in brush etc.

A number of towing system inventions have been patented which attempt to solve problems relating to the use of simple tow ropes. One of the earliest of these is the patent to Silva (U.S. Pat. No. 1,591,686; Jul. 6, 1926). This invention discloses a case which encloses a shaft attached to a spring. A tow rope is also affixed to the shaft. The spring tends to rotate the shaft which rotates and winds the tow rope around the shaft when the tow rope is not in use.

The patent to MacMullan (U.S. Pat. No. 5,476,280; Dec. 19, 1995) discloses another retracting towing system. This device is similar to that shown in Silva in that it includes a spring loaded shaft around which the tow rope is wound when not in use. This patent discloses a common problem relating to retracting tow systems: stress upon the retracting element. That is, when a towing system is in operation, the relatively delicate retracting system is subjected to the stress from the tow rope when a tow vehicle is pulling a second vehicle. McMullan solves this problem by including a length of chain close to the towing vehicle. The chain is removably affixed to a hook when in use such that the stress is taken by the hook rather than the retracting system.

The patent to Colby (U.S. Pat. No. 3,881,751; May 6, 1975) discloses another method of preventing the tow stress from damaging the retracting elements. Colby includes stop fitting which hit a plate such that the tow stress is taken by the plate rather than by the retracting mechanism.

A fairlead is often found on retracting tow systems. The fairlead is usually a ring or similar element through which the tow rope passes just before it leaves the device. The fairlead acts to "center" the tow rope and prevents it from moving from side to side. In prior art devices the fair lead is aligned with the axle about which the tow rope is wound.

The instant invention is a retracting tow system which is unique, original, and solves all of the above noted problems relating tow ropes and retracting towing devices.

The ideal retracting tow system should provide for a secure tow rope which may be used for a variety of purposes including towing a second vehicle. The ideal retracting tow system should also provide a means for automatically retracting and storing the tow rope when not in use. The ideal retracting tow system should also provide for tension on the tow rope such that, when in use, the tow rope remains taught and does not become slack. The ideal retracting tow system should also provide a method of attachment for the tow rope which eliminates damage caused by stress on the tow rope without requiring the addition of additional elements to the retracting tow system. The ideal retracting tow system should also provide a fairlead which properly aligns the tow rope and also reduces stress created by the retracting apparatus. The ideal retracting tow system should also provide a retracting tow system which allows the hook of the retracting tow system to be held in place such that accidental tow rope extraction is prevented. The ideal retracting tow system should also be rugged, inexpensive, and easy to use.

SUMMARY OF THE INVENTION

The retracting tow system of the instant invention is a spring powered device which includes a tow rope which is automatically wound about a spool when not in use and provides a secure platform for using a tow vehicle to tow a second vehicle using the tow rope. The instant invention could also be used for a variety of other purposes such as pulling stumps.

The instant invention includes a generally "U" shaped base which may be affixed to a tow vehicle in any acceptable manner. There are two holes in the uprights of the base which secure a shaft which may rotate within the holes. A spring case is affixed to one of the uprights and encloses a spiral spring of the type commonly known as a clock spring. The shaft protrudes into the spring case. The inner end of the spring is affixed to the shaft and the outer end of the spring is affixed to the spring case. A spool, having the general shape of a hollow cylinder is affixed to the shaft between the uprights of the base. There is a spool hole through the surface of the spool which places the central portion of the shaft in communication with the area outside the spool.

One end of a tow rope passes through the spool hole and is affixed to the shaft. It should be understood that the manner of attachment of the tow rope to the shaft is relatively unimportant and the tow rope may even move around the shaft. There is a loop in the other end of the tow rope where the tow rope is wrapped about a thimble. A hook is affixed to the loop by an eye in the hook. When the tow rope is pulled from the retracting tow system the spring unwinds and tends to force the shaft to turn. When the tow rope is released or there is not tension on the tow rope, the spring tends to cause the shaft to rotate which, in turn, causes the tow rope to wrap around the spool. A hook keeper protrudes inward from one of the uprights of the base and includes a keeper hole into which the hook may be placed when the tow rope is wound about the spool and not in use.

A fairlead bracket protrudes rearward from near the bottom of the base. (The vehicle to be towed or the second vehicle is considered to be rearward from the tow vehicle.) A fairlead, which has the general shape of an elongated donut, is affixed to the fairlead bracket and the tow rope passes through the fairlead such that the fairlead is between the end of the tow rope affixed to the shaft and the hook. The fairlead is offset from the shaft such that the tow rope bends where it passes through the fairlead.

One of the major objects of the present invention is to provide for a secure tow rope which may be used for a variety of purposes including towing a second vehicle.

Another object of the present invention is to provide a means for automatically retracting and storing the tow rope when not in use.

Another object of the present invention is to provide for tension on the tow rope such that, when in use, the tow rope remains taught and does not become slack.

Another object of the present invention is to provide a method of attachment for the tow rope which eliminates damage caused by stress on the tow rope without requiring the addition of additional elements to the retracting tow system.

Another object of the present invention is to provide a fairlead which properly aligns the tow rope and also reduces stress on the retracting apparatus and the vehicle to which it is attached.

Another object of the present invention is to provide a retracting tow system which allows the hook of the retracting tow system to be held in place such that accidental tow rope extraction is prevented.

Another object of the present invention is to provide a retracting tow system which is rugged, inexpensive, and easy to use.

These and other features of the invention will become apparent when taken in consideration with the following detailed description and the drawings.

DESCRIPTION OF A PREFERRED EMBODIMENT

Figure 1:
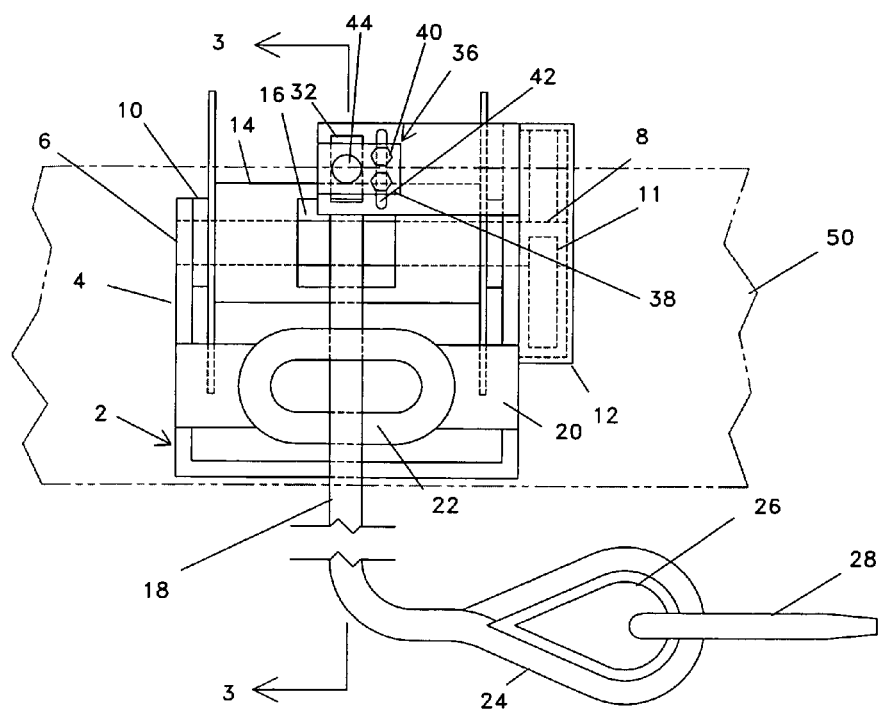
FIG. 1 is a front view of the retracting tow system of the instant invention.
Figure 2:
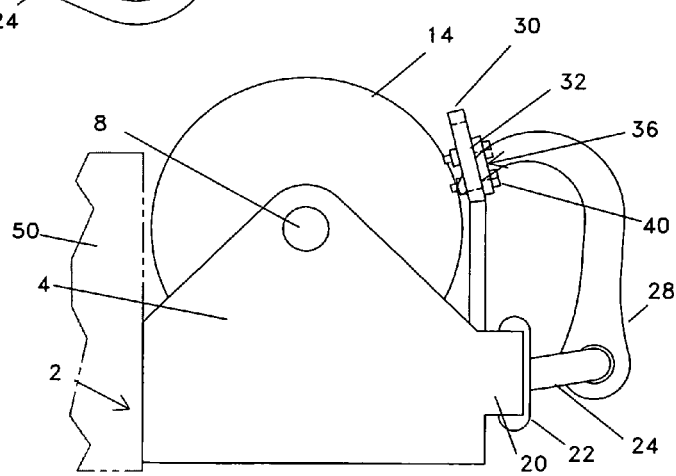
FIG. 2 is a side view of the instant invention.
Figure 3:
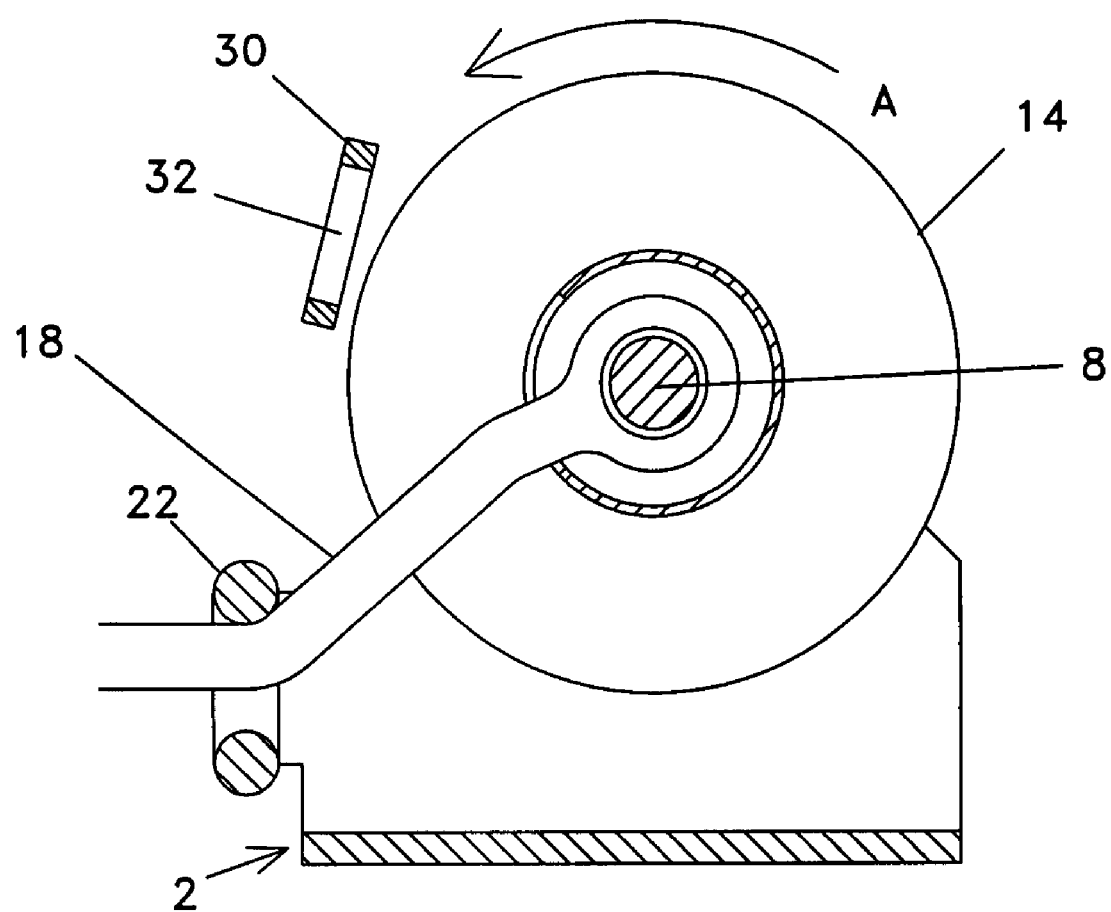
FIG. 3 is a cross section view of the instant invention taken along line 3-3 of FIG. 1.

Referring to the drawings, FIGS. 1, 2, and 3, there are various views of the retracting tow system of the instant invention. The device is intended to be affixed to a tow vehicle and may be used for a variety of purposes including towing a second vehicle. For purposes of the following description, the second vehicle is considered to be rearward of the tow vehicle.

Referring now to FIG. 1, a base 2 is provided which has the general shape of a "U" with two uprights 4. The base 2 may be affixed to the tow vehicle, for instance, by being attached to a rear bumper 50 of the tow vehicle. The uprights 4 have holes 6 through their upper ends. A shaft 8 rides within the holes 6 in said uprights 4 and protrudes through and beyond one of said uprights 4. A pair of collars 10 are affixed to the shaft 8 just inside the two uprights 4 such that said shaft 8 may rotate freely within the holes 6, but may not move longitudinally. A spring case 12 is affixed to the outside of said upright 4 through which said shaft 8 protrudes. A clock spring 11 is fitted within the spring case 12 with its inner end affixed to said shaft 8 and its outer end affixed to the spring case 12. A spool 14 is affixed to said shaft 8 inside of the collars 10. The spool 14 has the shape of a conventional spool except that there is a spool hole 16 through the inner surface of said spool 14 such that the portion of said shaft 8 within said spool 14 is in communication with the area outside of said spool 14.

Still referring to FIG. 1, a tow rope 18 is passed through the spool hole 16 and is affixed to said shaft 8 in any suitable manner. It should be noted that the tow rope 18 need not be tightly affixed to said shaft 8, but may move freely about or up and down said shaft 8. A fairlead bracket 20 protrudes rearward from said uprights 4 near the bottom of said uprights 4. A fairlead 22 is affixed to the fairlead bracket 20 such that the fairlead 22 is centered between said uprights 4 and is near the bottom of said uprights 4. Said fairlead 22 is perpendicular to or nearly perpendicular to the bottom surface of the base 2. Said fairlead 22 has the general shape of an elongated donut. Said tow rope 18 passes through said fairlead 22. There is a loop 24 in the end of said tow rope 18 on the end opposite the end which is affixed to said shaft 8. The loop 24 is formed around a thimble 26. A conventional hook 28 is affixed to said loop 24.

Still referring to FIG. 1, a hook keeper 30 protrudes inward from one of said uprights 4 near the top of said upright 4 toward the center of said spool 14. The hook keeper 30 includes a keeper hole 32 which an appropriate shape such that the end of the hook 28 may be secured within the keeper hole 32 when not in use.

Referring now to FIG. 2, a side view of the instant invention is shown. This view shows the instant invention in the configuration in which said tow rope 18 is not in use and is being stored. This view shows said hook 28 secured in the keeper hole 32 in said hook keeper 30. This view also better shows the position of said fairlead 22 relative to said shaft 8. That is, said fairlead 22 is offset from said shaft 8.

Referring now to FIG. 3, a cross sectional view taken along line 3-3 of FIG. 1 is shown. This view better shows the method of attachment of said tow rope 18 to said shaft 8. Said tow rope 18 is affixed to said shaft 8, passes through said spool hole 16 in said spool 14, and through said fairlead 22. This view shows the retracting tow system in an in use configuration. That is said tow rope 18 has been pulled off of said spool 14. The clock spring 11 places very little tension on said shaft 8 when the instant invention is in the configuration shown in FIG. 2. There is just enough tension supplied by said clock spring 11 to hold said hook 28 in said hook keeper 30 (as shown in FIG. 2). As is shown in FIG. 3, more and more tension is built up in said spring 11 as said tow rope 18 is pulled from said spool 14. Therefore, said clock spring 11 tends to force said shaft 8 (and said spool 14) in the direction shown by arrow A. When the tension on said tow rope 18 is released or reduced to less than the force applied by said clock spring 11, said shaft 8 rotates in the direction of arrow A and said tow rope 18 is automatically wound about said spool 14. It should be understood that the direction of said arrow A is relatively unimportant so long as said clock spring 11 tends to force said shaft 8 to rotate in either direction. This view also shows the effect of said fairlead 22 being offset from said shaft 8. Because said fairlead 22 is offset from said shaft 8, the force from tension on said tow rope 18 through said base 4 into the vehicle is reduced. That is, when a vehicle is being towed, the forced bend in said tow rope 18 caused by said offset fairlead 22, means that the direct force transferred through said base 4 into the vehicle is significantly reduced.

Referring again to FIG. 1, said hook keeper 30 is supplemented by a hook adjuster 36. The hook adjuster 36 includes an adjuster plate 38 which is affixed to said hook keeper 30 by means of a couple of adjuster bolts 40 which are removably affixed through an adjuster slot 42 in said hook keeper 30. The adjuster plate 38 includes an adjuster hole 44 which is aligned with the hole in said hook keeper 30. The adjuster hole 44 is slightly larger in diameter than the diameter of said hook 28 such that the end of said hook 28 fits within said adjuster hole 44. Said adjuster plate 39 may be moved along the adjuster slot 42 and affixed using the adjuster bolts 40.

Referring again to FIG. 2, a side view of said hook adjuster 36 is shown. In this view the relationship between said hook keeper 30 and said hook adjuster 36 may be seen. This view also shows how said hook adjuster 36 is affixed to said hook keeper 30 using said adjuster bolts 40.

In operation, the retracting tow system of the instant invention is as described below. In a stored or not in use configuration as is shown in FIG. 2, said hook 28 is removably held in said hook keeper 30. In this configuration there is just enough tension on said clock spring 11 to keep said tow rope 18 wound about said spool 14 and to hold said hook 28 in said keeper hole 32. When the instant invention is in used as is shown in FIG. 3, said tow rope 18 is pulled from said spool 14 which increases the tension on said clock spring 11. Said hook 28 is removably affixed to some appropriate location on the vehicle to be towed. The tow vehicle then may pull the towed vehicle to an appropriate location. While the vehicle is being towed, the majority of the force is on sturdy shaft 8. Because of the manner of connection of said tow rope 18 to said shaft 8, there is no need to include a secondary element to relieve the stress of a towing operation from the retracting elements of the invention. Because said clock spring 11 tends to force said shaft 8 to rotate, any slack which may occur during the course of a tow is taken up by winding some amount of said tow rope 18 about said spool 14. This insures that said tow rope 18 does not drag along the ground or become entangled in brush or similar debris. After the tow is completed, said hook 28 is removed from the towed vehicle. Said tow rope 18 is automatically wound about said spool 14. Said hook 28 may be placed in said hook keeper 30 for convenient storage. For a variety of reasons including stretching and wear, said hook 28 may not fit properly in said hook keeper 30 to hold said hook in place. The position of said hook 28 in said hook keeper 30 may be adjusted using said hook adjuster 36 to insure a proper fit said hook 28 in tension to hold it in place.

In the preferred embodiment of the instant invention, all parts and elements are conventional and may be obtained from many sources. Structural elements including said base 2 and said shaft 8 are made from steel, but other materials having the same strength and resistance to weather could be used.

While preferred embodiments of this invention have been shown and described above, it will be apparent to those skilled in the art that various modifications may be made in these embodiments without departing from the spirit of the present invention.

We claim:

1. A retracting tow device for attachment to a vehicle, comprising:
   (1) a base with the forward portion of the base affixed to the vehicle;
   (2) an axle rotatably affixed within said base;
   (3) a spool which is affixed to said axle, the spool having an interior portion which encloses said axle and includes a hole which places said axle in communication with the outside of the interior portion of said spool;
   (4) a tow rope which is affixed to said axle and threaded the hole in the interior portion of said spool;
   (5) spring means affixed to said axle and tending to cause said axle to rotate within said base and such that when there is no tension upon an end of the tow rope not affixed to said axle, said axle rotates and causes said tow rope to be wound around said spool;
   (6) a hook affixed to the end of said tow rope not affixed to said axle and a hook keeper affixed to said base such that when the retracting tow device is not in use, the hook may be removably affixed to said hook keeper and the tension of said spring means keeps said hook removably affixed to said hook keeper; and
   (7) a hook adjuster removably affixed to said hook keeper such that the position of said hook within said hook keeper may be adjusted using the hook adjuster to insure a tight fit with said tow rope in tension.

2. A retracting tow device for attachment to a vehicle, comprising:
   (1) a base with the forward portion of the base affixed to the vehicle;
   (2) an axle rotatably affixed within said base;
   (3) a spool which is affixed to said axle, the spool having an interior portion which encloses said axle and includes a hole which places said axle in communication with the outside of the interior portion of said spool;
   (4) a tow rope which is affixed to said axle and threaded through the hole in the interior portion of said spool;
   (5) spring means affixed to said axle and tending to cause said axle to rotate within said base and such that when there is no tension upon an end of the tow rope not affixed to said axle said, axle rotates and causes said tow rope to be wound around said spool;
   (6) a hook affixed to the end of said tow rope not affixed to said axle and a hook keeper affixed to said base such that when the retracting tow device is not in use, the hook may be removably affixed to said hook keeper and the tension of said spring means keeps said hook removably affixed to said hook keeper;
   (7) a fair lead affixed to the rearward edge of said base and said tow rope is passed through a hole in the fair lead after said tow rope leaves said spool and said fair lead is offset from said axle such that there is always a bend in said tow rope even when the retracting tow device is in use and all of the length of said tow rope has been unwound from said spool; and
   (8) a hook adjuster removably affixed to said hook keeper such that the position of said hook within said hook keeper may be adjusted using the hook adjuster to insure a tight fit with said tow rope in tension.

* * * * *